Dec. 14, 1948.    T. IAVELLI ET AL    2,455,933
POWER TRANSMISSION

Original Filed Nov. 28, 1940    4 Sheets-Sheet 1

INVENTORS.
Teno Iavelli,
Victor E. Matulaitis.
BY
ATTORNEYS.

Dec. 14, 1948.  T. IAVELLI ET AL  2,455,933
POWER TRANSMISSION
Original Filed Nov. 28, 1940  4 Sheets-Sheet 4

INVENTORS.
Teno Iavelli
Victor L. Matulaitis
BY
Harness, Dickey, Pierce & Harris
ATTORNEYS.

Patented Dec. 14, 1948

2,455,933

UNITED STATES PATENT OFFICE 2,455,933

POWER TRANSMISSION

Teno Iavelli and Victor E. Matulaitis, Detroit, Mich., assignors to Chrysler Corporation, Highland Park, Mich., a corporation of Delaware Original application November 28, 1940, Serial No. 367,584. Divided and this application December 4, 1941, Serial No. 421,558

24 Claims. (Cl. 74—472)

1

This invention relates to motor vehicles and refers more particularly to power transmission and control mechanism therefor and is a division of our copending application Serial No. 367,584 filed November 28, 1940, which has eventuated in Patent No. 2,436,388, issued February 24, 1948.

Our invention has particular reference to transmission systems in which the torque load is relieved as by momentary interruption of the engine ignition or by other suitable means in order to unload positively engageable drive control elements so as to facilitate disengagement of such elements. One example of such a transmission is described and claimed in the copending application of Carl A. Neracher et al., Serial No. 335,310, filed May 15, 1940 now Patent No. 2,455,943 dated December 14, 1948.

One object of our invention is to provide improved and simplified means for controlling the torque-relieving or torque-reversing means.

Another object is to provide a transmission control which is more fool-proof in its operation and in the general drive functions of the vehicle.

A further object is to provide improved control means for the torque-relieving means whereby the torque relief is brought about only as an incident to the one desired direction of movement of the actuating means for the movable or shiftable drive control element and not during the return direction of movement of this actuating means.

Another object is to provide an improved servomotor assembly for controlling shift of the shiftable drive control element.

An additional object is to provide an improved servomotor which is very compact and which takes up relatively little room.

Another object is to provide an improved servomotor of the vacuum operated electromagnetically controlled type in which the parts are advantageously arranged for low cost, simplified manufacture, novel sub-assembly of the electromagnet structure, and for so telescoping certain of the parts as to greatly reduce the overall length, weight and cost of the motor.

Further objects and advantages of our invention reside in the novel combination and arrangement of parts more particularly hereinafter described and claimed, reference being had to the accompanying drawings in which:

2

While our control may be employed in conjunction with various types and arrangements of motor vehicle transmissions, especially where a pair of relatively movable positively engageable drive control elements are employed, in order to illustrate one driving system we have shown our invention in connection with certain parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

Figure 1:
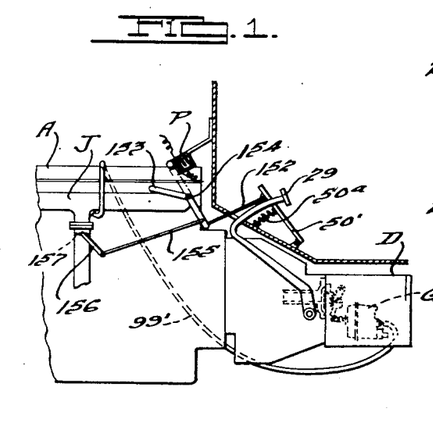
Fig. 1 is a side elevational view showing the motor vehicle engine and power transmission.
Figure 2:
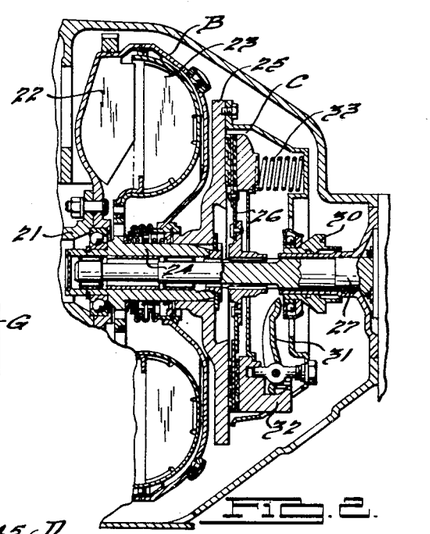
Fig. 2 is a longitudinal sectional elevational view through the main clutching mechanism.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Figure 3:
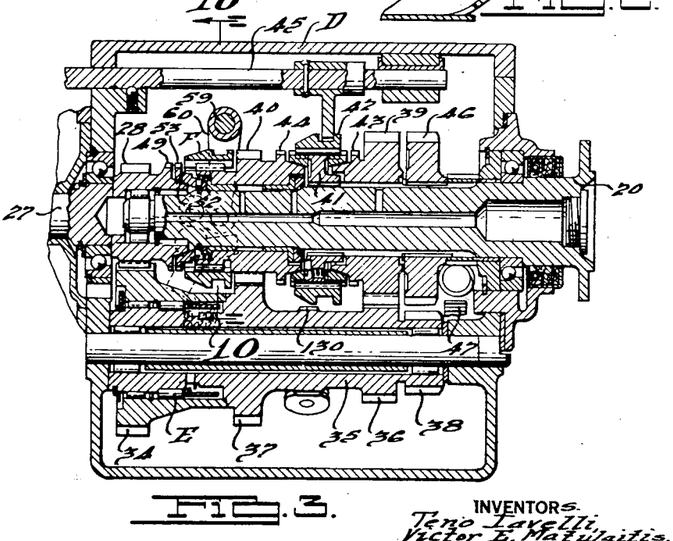
Fig. 3 is a similar view through the change speed transmission.
Figure 4:
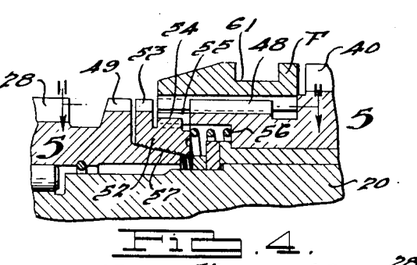
Fig. 4 is a detail enlarged view of the blocker clutch as seen in Fig. 3.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28, thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutch shaft 27 directly to gear 40. The sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby allowing spring 50ª to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

Figure 5:
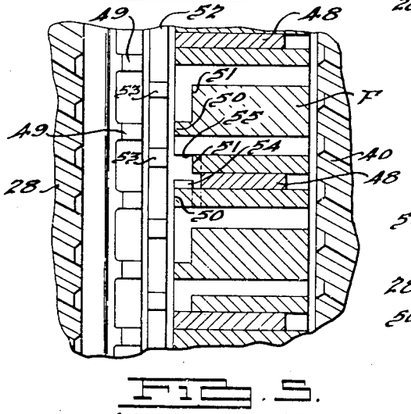
Fig. 5 is a sectional plan view illustrated as a development according to line 5—5 of Fig. 4, the automatic clutching sleeve being released.
Figure 6:
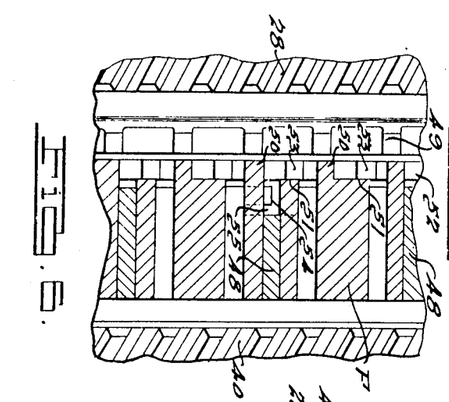
Fig. 6 is a similar view showing the automatic clutching sleeve in its intermediate shift position during the drive blocking condition.

During drive in first and third, the speed of shaft 27 exceeds the speed of gear 40 so that, if sleeve F is fully released, the parts will be positioned as in Fig. 5 wherein the blocker teeth 53 are axially in alignment with the short teeth 51. If now the sleeve F is urged forwardly it will move to the Fig. 6 position of drive blocking and will remain in this blocked position as long as the engine drives the car in first or third.

Figure 7:
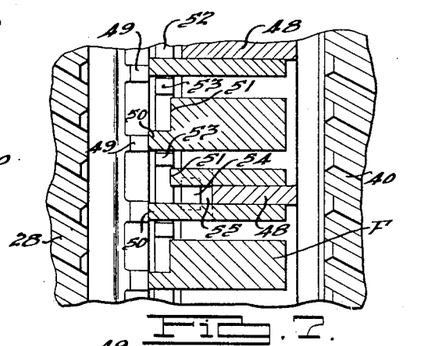
Fig. 7 is a similar view showing the automatic clutching sleeve in its coasting relationship for the Fig. 6 showing, the clutching sleeve being unblocked during coast for its clutching movement.
Figure 8:
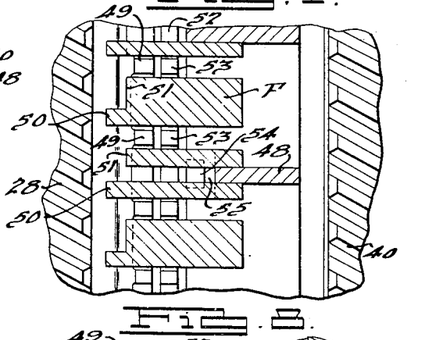
Fig. 8 is a similar view showing the automatic clutching sleeve in full clutching engagement.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

Figure 9:
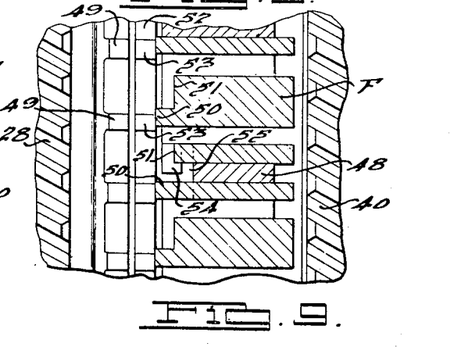
Fig. 9 is a view similar to Fig. 5 but showing the automatic clutching sleeve in its other intermediate shift position during the coast blocking condition.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

Figures 10, 11:
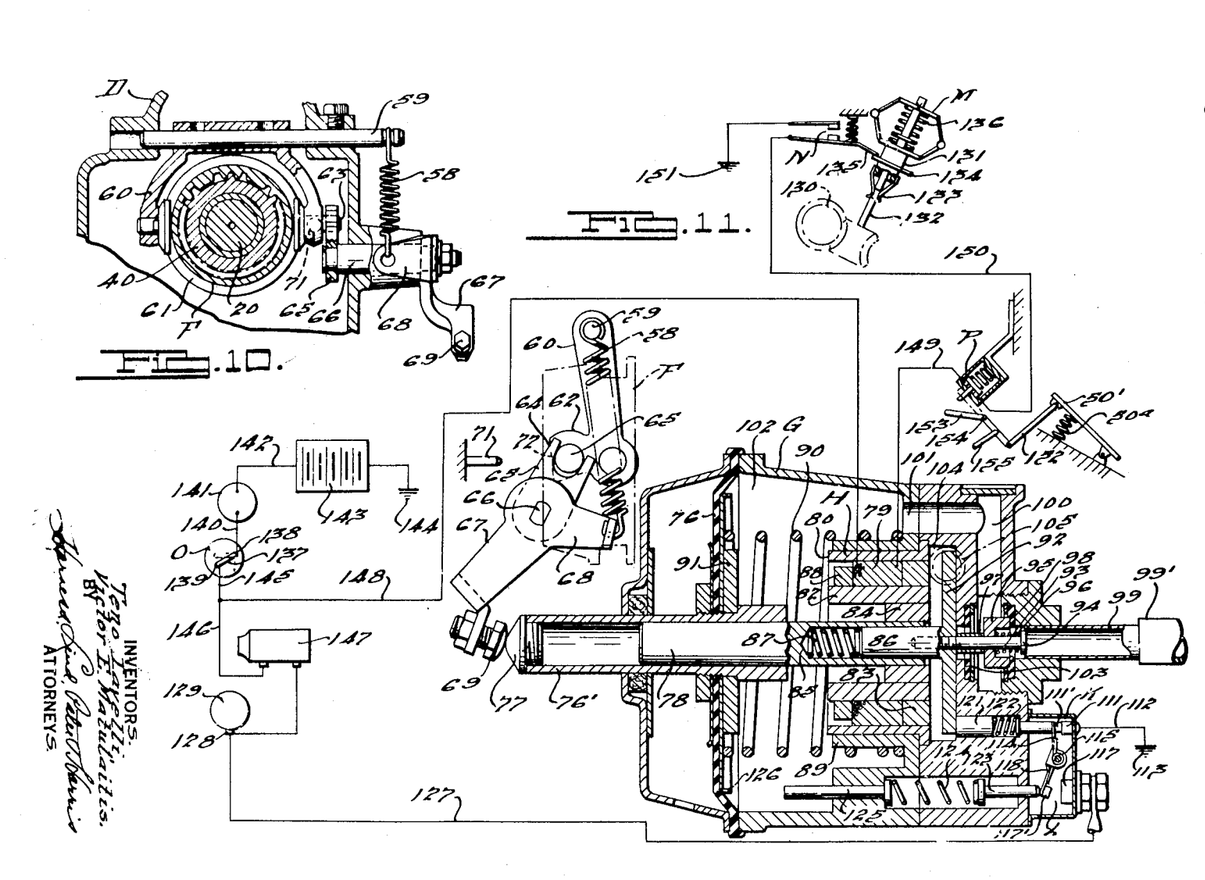
Fig. 10 is a sectional elevational view taken approximately as indicated by line 10—10 in Fig. 3 but showing only the upper portion of the transmission mechanism and particularly the lever operating mechanism for the automatic clutching sleeve.
Fig. 11 is a diagrammatic view of the control mechanism for the automatic clutching sleeve, the latter being shown in its released position.
Figure 12:
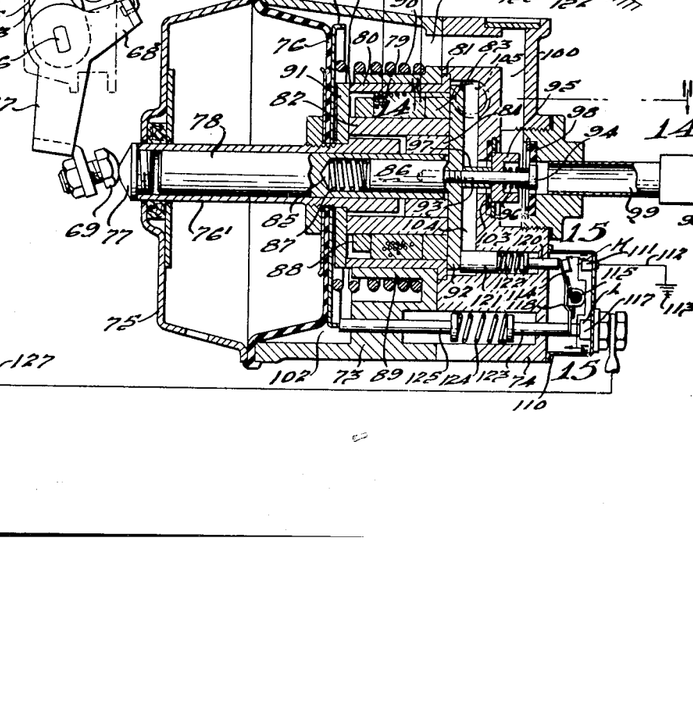
Fig. 12 is a similar view of the Fig. 11 mechanism corresponding to engaged position of the automatic clutching sleeve.

The transmission is provided with our improved prime mover means for controlling shift of sleeve F along with several control means. Referring particularly to Figs. 11 and 12, there is illustrated a pressure fluid operated motor G utilizing air pressure for its operation. For convenience this motor is arranged to operate by the "vacuum" in the intake manifold system of the engine under control of electromagnetic means.

Forward shift of sleeve F is effected, under control of motor G, by reason of a spring 58 having its upper end fixed by engaging the outboard portion of a transverse shaft 59 fixed in the housing of transmission D. Mounted to freely rock on shaft 59 is a shift yoke 60 which engages the shift groove 61 of sleeve F, this yoke having one of its arms provided with a forwardly extending lever 62 carrying a lateral pin 63 which engages the yoke portion 64 of an upstanding lever 65. This lever 65 is fixed to the inboard end of a rockshaft 66 the outboard end of which has fixed thereto a bell-crank follower lever member having lever arms 67 and 68. The end of lever 68 is connected to the lower end of spring 58 and lever 67 carries an adjustable abutment 69 for taking up any play in the linkage mechanism.

Spring 58 acts to yieldingly urge engagement of sleeve F, acting through lever 68 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

The motor G comprises a control body casting 73 to which is secured the rear body casing 74 and the forward closure 75. A piston preferably of the diaphragm type 76 has its outer end fixed between closure 75 and body 73 while its inner or central portion is secured to the rear portion of a hollow reciprocatory leader member or piston rod 76'. The forward end of this piston rod carries a closure abutment member 77 fixed thereto and arranged to engage abutment 69 during its accurate swing about the axis of shaft 66. The rear end of rod 76' is open and telescopically receives the guide rod 78 of a unitary assembly H for the coil 79 of the electromagnet.

The assembly H comprises an outer ferrous electromagnet cylinder 80 having a rear outwardly extending flange 81 and an inner ferrous electromagnet cylinder 82 disposed concentrically within cylinder 80 and receiving the coil 79 therebetween. The cylinders 80, 82 are the main flux-directing elements of the electromagnet for forming the flux path when magnetically activated by coil 79. A non-ferrous annulus 83 is disposed between cylinders 80, 82 at the rear ends thereof and a second non-ferrous annulus 84 is disposed between the rear end of cylinder 82 and the rear end of guide rod 78 which is bored out at 85 to slidably receive a guide plunger 86 urged rearwardly by spring 87. The rear faces of annuli 83, 84 are flush with the rear faces of cylinders 80, 82. A ferrous annulus 88 is seated around cylinder 82 at the front end of coil 79, this annulus having a gap within the cylinder 80 and having its forward face spaced rearwardly from the flush front faces of cylinders 80, 82 to form a shunt flux path as will be presently apparent. The assembly H comprising cylinders 80, 82, rod 78 and annuli 83, 84, 88 are hydrogen welded or brazed so as to form a permanent unitary assembly in conjunction with coil 79. The assembly H is formed in this unitary fashion and then assembled as a unit fixed in the motor G, the cylinder 80 slidably fitting within a cylinder bracket 89 which is formed as a part of body 73. The flange 81 is secured between bodies 73, 74 as illustrated and the guide rod 78 slidably guides reciprocatory movement of piston rod 76' as piston 76 moves between its Fig. 11 and Fig. 12 positions.

Thrusting forwardly on piston 76 is a spring 90 of much greater force than that of spring 58 so that spring 90 can act to release sleeve F as in Fig. 11. In order to releasably hold the piston in its Fig. 12 position we provide a plate armature 91 fixed with respect to piston 76 and rod 76' and adapted for engagement with the front faces of cylinders 80, 82 as in Fig. 12.

At the rear of the unit H there is provided a second plate armature 92 engageable as in Fig. 12 with the rear faces of cylinders 80, 82 and fixed to a pin 93 which is secured to plunger 86 and projects rearwardly therefrom and terminates in a head 94. This pin 93 loosely mounted a valve member 95, a spring 96 acting between head 94 and the valve to urge the latter forwardly against a spacer sleeve 97 disposed between armature 92 and the valve.

Figure 14:
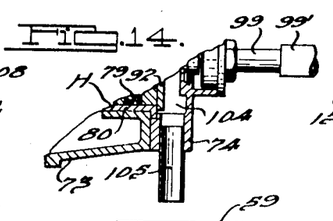
Fig. 14 is a detail sectional view showing the venting system for the pressure fluid motor, the view being taken approximately as indicated by line 14—14 of Fig. 12.

The body 74 is formed with a valve seat 98 cooperable with valve 95 to control supply of vacuum from pipe 99 to the body passage 100 which extends by passage 101 in body 73 for communication with the working chamber 102 at the rear face of piston 76. Pipe 99 extends through flexible pipe 99' to the engine intake manifold J. Body 74 has a second valve seat 103 spaced around sleeve 97 and also cooperable with valve 95 to control venting communication between passage 100 and a venting chamber 104 within which the armature 92 moves. Chamber 104 communicates with a vent 105 (Fig. 14) which leads to the atmosphere and which may be equipped with a conventional air cleaner (not shown).

Figure 13:
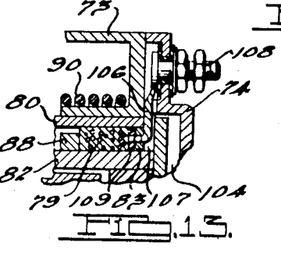
Fig. 13 is a detail sectional view of one of the terminal connections for the coil of the electromagnet.

In Fig. 13 we have illustrated one of the leads 106 for the coil 79, this lead extending rearwardly from the coil through an opening in annulus 83 and then outwardly in a slot 107 milled in the rear face of this annulus for connection with terminal 108 insulated with respect to body 74. A sealing grommet 109 is disposed in a recess in annulus 83 around lead 106 so as to prevent leakage between chamber 102 and the atmosphere by way of chamber 104 and vent 105. The other lead for coil 79 extends in similar manner to its terminal just as in Fig. 13 for controlling energization of the coil.

We also provide means which functions to relieve the thrust-application between the teeth of sleeve F and the teeth 49 thereby facilitating movement of the drive control sleeve element F from its Fig. 12 position of engaging relationship into its Fig. 11 position of disengaging relationship with respect to teeth 49. This relief means, in the present embodiment of our invention, is in the form of a system of grounding the primary terminal of the usual distributor of the engine ignition system whereby the engine ignition may be momentarily rendered inoperative thereby unloading the torque at sleeve F sufficiently to insure its release by spring 90.

Figure 15:
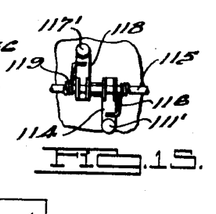
Fig. 15 is a detail view taken as indicated by line 15—15 of Fig. 12.

The interrupting system is under control of a pair of interrupter switches K and L which function to momentarily interrupt the ignition. These switches K and L are mounted in a switch casing 110. Switch K comprises a fixed contact 111 which is connected by conductor 112 to a ground at 113. Contact 111' is carried by a bracket 114 loosely mounted on a fixed rod 115 and yieldingly urged into its Fig. 12 switch open position by a spring 116 (Fig. 15). Switch L likewise comprises a stationary contact 117 and a contact 117' carried by a bracket 118 loose on rod 115 and yieldingly urged to its Fig. 11 switch open position by a spring 119.

Engaging the bracket 114 is a pin 120 slidable in body 74 and adapted to be urged rearwardly by a plunger 121 acting through a spring 122. The front face of the plunger 121 is in contact with the rear face of armature 92, the arrangement being such that when the armature moves rearwardly from its Fig. 12 position to its Fig. 11 position, plunger 121 compresses spring 122 and causes contact 111' to swing against the action of spring 116 to close switch K as in Fig. 11. Likewise when armature 92 moves back to its Fig. 12 position the spring 116 restores the parts to their Fig. 12 positions.

Engaging bracket 118 is a generally similar pin 123 operably connected through the action of compression spring 124 with a plunger 125 which slidably extends through body 73 to engage the flanged reinforcing member 126 of the piston 76. The spring 124 is so designed that with the piston 76 as in Fig. 12 it will act through pin 123 to maintain switch L closed as in Fig. 12. When piston 76 moves forwardly to its Fig. 11 position spring 124 will hold switch L closed until near the end of the piston travel at which time the force of spring 124 is so reduced that spring 119 then acts to swing bracket 118 forwardly along with pin 123 thereby opening switch L as in Fig. 12. Contact 117 extends by conductor 127 to the primary terminal 128 of distributor 129. Contacts 111' and 117' are electrically connected with each other through their brackets 114, 118, and rod 115 and terminals 111 and 117 are of course electrically insulated from casing 110. Likewise pins 120 and 123 are either insulated with respect to brackets 114 and 118 or made of non-conducting material.

It is deemed preferable to provide a speed control on the energization of the electromagnetic coil 79 so as to insure automatic release of sleeve F below a predetermined car speed and to accommodate automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 130 is a governor M of any suitable type, this governor operating a sleeve 131 outwardly along its drive shaft 132 as the car speed reaches a predetermined point, the break-away being under control of a detent 133 if desired.

The sleeve 131 has a shoulder 134 engaged by the swinging switch piece 135 of the governor switch N. When the car is stationary the detent 133 is engaged and switch N is open. As the car accelerates the governor eventually reaches its critical speed and detent 133 releases thereby causing switch N to close. As the car slows down, the governor spring 136 restores the parts to the Fig. 11 position and by proportioning the various parts it is obvious that switch N may be made to function at desired speeds proportionate to car travel. As an example of one arrangement of governor operation and gearing arrangement, the governor may be made to close switch N during car acceleration in first and third respectively at approximately 7 and 15 M. P. H. (miles per hour), the switch N opening on stopping the car in direct and second at approximately 7 and 3 M. P. H. respectively.

The driver operated ignition switch is designated at O and comprises a conductor 137 which, in the Fig. 11 position showing the switch "on" or closed, electrically connects contacts 138 and 139. Contact 138 extends by conductor 140 to ammeter 141 and thence by conductor 142 to the usual storage battery 143 and thence to ground 144. Contact 139 has a conductor 145 extending by conductor 146 branching therefrom to the engine ignition system herein shown in part as comprising coil 147 and distributor 129 having the aforesaid primary terminal 128.

A second conductor 148 branches from conductor 145 to one of the terminals 108 of coil 79 and thence by the other terminal to conductor 149 to the kickdown switch P and then by conductor 150 through switch N and ground 151. The switch P is normally closed and is opened preferably by a full depression of accelerator pedal 50' acting through link 152 and a bell-crank lever 153 pivotally mounted at 154. Lever 153 actuates a link 155 which extends forwardly to adjust the engine throttle valve lever 156. When pedal 50' is thus depressed, the lever 156 is positioned to fully open the throttle valve 157 and as the throttle valve is adjusted in its wide-open range the lever 153 opens switch P to effect a step-down in the transmission from fourth to third or from second to first by de-energizing the coil 79.

Switches P and N are in series so as to form a governor kickdown circuit as follows: Ground 144 to battery 143 thence by conductor 142 to ammeter 141 and by conductor 140 to ignition switch O. From switch O this circuit extends through conductors 145 and 148 to coil 79 and thence by conductor 149, switch P, conductor 150 and switch N to ground 151.

In the operation of the mechanism, the car at standstill and with ignition switch O closed and the engine idling will cause governor switch N to remain open as in Fig. 11 thereby breaking the governor kickdown circuit and de-energizing coil 79 even though the kickdown switch P is closed at this time. The parts are then in their Fig. 11 positions with valve 95 seated at 98 so that vacuum at pipe 99 is shut off from passage 100 and chamber 102 while this passage and chamber are open through seat 103 to chamber 104 and vent 105 thereby allowing spring 90 to hold piston 76 and rod 76' forwardly projected and sleeve F disengaged. Armature 91 is thus positioned forwardly away from coil 79 and armature 92 is positioned rearwardly from the coil but not so far but that it will respond to energization of the coil. Spring 87 acting through plunger 86, armature 92 and sleeve 97 is now acting to hold valve 95 against seat 98 as well as to position armature 92 in Fig. 11. With the armature moved rearwardly switch K is thereby closed and with piston 76 moved forwardly switch L is thereby open so that the ignition system may operate normally without being grounded.

The driver now shifts sleeve 42 to either the high or low range and accelerates the car, ordinarily above the critical speed of governor M thereby causing switch N to close and establish the governor kickdown circuit. When this occurs the coil 79 is energized and armature 92 moves electromagnetically to its Fig. 12 position of magnetic attraction to the electromagnet means 79, 80, 82, the annulus 88 constituting a gap shunt for the electromagnetic circuit at this time.

When armature 92 moves forwardly, valve 95 is caused to seat at 103 by spring 96, this spring insuring proper seating of the valve and compensating for an otherwise difficult problem of seating armature 92 at the cylinders 80, 82 of the electromagnetic circuit at the same time of seating the valve 95. Spring 96 thus provides seating for the valve independently of seating the armature. The vent chamber 104 is now shut off from passage 100, the latter being open to the vacuum in manifold J through pipes 99, 99'. At the same time, forward movement of armature 92 unloads spring 122 and spring 116 then acts to open switch K.

As the vacuum in manifold J is now open to chamber 102, piston 76 moves rearwardly to its Fig. 12 position bringing armature 91 in a position of electromagnetic attraction with respect to cylinders 80, 82 where it is electromagnetically held independently of the presence of vacuum in chamber 102. Rearward movement of piston 76 acts through pins 125, 123 and spring 124 to close switch L, switch K being open. Rod 76' moves rearwardly, leaving lever 67 because the blocker 52 prevents engagement of sleeve F. As soon as the driver allows the engine to coast, sleeve F will engage teeth 49 synchronously under action of spring 58, to step-up the drive to either second or fourth although the step-up will be delayed by the blocker 52 until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor M directs a downshift on bringing the car to rest. Thus there is automatically provided a favorable torque-multiplying gearing for starting, as in third.

On bringing the car to a stop when sleeve F is clutched as in fourth, for example, the governor M opens the switch N to allow spring 90 to release sleeve F which it can do as the car is brought to a stop because of the low coasting torque at the teeth of sleeve F. The interruption of the ignition system at this time does not relieve or reverse the torque at the teeth of the sleeve unless the governor is arranged to open on coast down at a car speed below engine idle and such may be readily provided although by providing a spring 90 of proper strength the sleeve F will, in any event, release on car coast to a stop.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is thus fully depressed for the kickdown, switch P opens thereby de-energizing coil 79. Armature 91 and piston 76 cannot move forwardly to release sleeve F because the latter is under torque load by reason of the engine driving under open throttle. However, armature 92 immediately moves to its Fig. 11 position by spring 87 thereby causing valve 95 to shut off the vacuum supply to chamber 102 and to vent this chamber as aforesaid. Also, at this time the rearward armature movement acts through spring 122 and pin 120 to close switch K. Switch L being closed at this time, the ignition interrupting circuit is established to ground the ignition system at 113 and this causes the engine to unload the torque at sleeve F whereupon spring 90 acts through rod 76' and the sleeve linkage to disengage sleeve F. As the piston completes its forward stroke spring 124 unloads allowing switch L to open thereby restoring the engine ignition and allowing the engine to rapidly speed up to pick up the drive in third or first at the overruning cluth E. Springs 119 and 124 may be arranged to open switch L and restore the ignition appreciably prior to disengagement of sleeve F in which case when switch L closes as aforesaid a torque reversal occurs at the teeth of sleeve F facilitating its full disengagement by change from coast load imposed by closing of switch K so that if sleeve F does not fully release when switch K closes, a second reversal of torque will facilitate the sleeve release when switch L opens. Ordinarily sleeve F will always disengage in response to closing of switch K so that switch L may be arranged to open during the last travel of sleeve F rearwardly but either relationship of springs 124 and 119 may be employed.

When the driver releases the accelerator pedal, assuming governor switch N to be closed, coil 79 is energized to cause armature 92 to move to its Fig. 12 position opening switch K and moving valve 95 to supply vacuum to chamber 102. This causes piston 76 to move rearwardly and thereby close switch L but as switch K was previously closed the ignition is not interrupted during this stroke of the piston. As soon as the engine slows down to synchronize the teeth 49 with sleeve F, the latter will then shift forwardly by spring 58 to restore direct drive from pinion 28 to gear 40.

By slidably guiding rod 76' telescopically on the stationary guide rod 78 of unit H we have greatly shortened the necessary length of the motor as a whole. The unit H lends itself to economical quantity production and provides a subassembly which is easily handled and installed during assembly of the motor. The unit H is firmly mounted in the bracket 89 so as to support the cantilever guide rod 78.

The unit H functions as an electromagnetic holding device as it serves, when the vacuum retracts piston 76 from the Fig. 11 position to the Fig. 12 position, to releasably hold the piston independently of the continuance of vacuum in chamber 102 so that the kickdown or releasing spring 90 cannot project the piston back to its Fig. 11 position until coil 79 is de-energized.

Our arrangement of field coil 79 and flux-directing or flux-carrying field core portions 80, 82 is such that the magnetic loading or tension at the gaps closed by the armature 91 is in the general direction of movement of the armature and piston 76. Such arrangement is greatly more efficient as a holding device than solenoid devices wherein field core portions magnetically load the gap or gaps which are closed by a plunger-type of armature in a direction normal to the direction of armature movement, such solenoid devices being ordinarily employed where pulling or pushing of the armature is the prime consideration.

In our device we provide non-magnetic means such as differential pressure fluid to retract the piston 76 against the force of spring 90 and a coil 79 arranged to provide magnetic holding flux to hold the piston retracted independently of the continuance of differential pressure fluid such as vacuum.

Electromagnets in general embody at least two gaps in forming a magnetic circuit between the field core and armature, our arrangement being such as to utilize both of these gaps for magnetically loading or tensioning the armature in the general direction of its movement. At the time that the piston 76 is retracted by vacuum, the field core portions 80, 82 are magnetically connected or bridged by armature 92 which at such time functions as part of the core means so that, in effect, there are at this time two gaps in the magnetic circuit at the forward ends of field portions 80 and 82 respectively. These gaps are closed by armature 91 such that the magnetic loading is in the direction of movement of the armature or axially of the travel of piston 76.

We claim:

1. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; releasable holding means for holding said operating member in its said first position; control means for controlling said holding means to effect release thereof; means operating to urge movement of said operating member from its said first position to its said second position when released by said holding means; power operating means for moving said operating member from its said second position to its said first position; second control means for said power operating means operating, when said operating member is in its said second position, to cause said power operating means to move said operating member from its said second position to its said first position; grounding means for said ignition system comprising a pair of switches in series with each other; switch operating means for one of said switches comprising means biasing this switch open, and means operating to close this switch in response to movement of said operating member from its said second position to its said first position, said switch operating means for closing said one switch comprising a lost-motion spring connection between said operating member and said one switch adapted for spring unloading action in response to predetermined movement of said operating member from its said first position to its said second position thereby to permit said biasing means to open said one switch; and second switch operating means for the other of said switches comprising means operating to close this switch in response to operation of the first said control means in releasing said holding means, said second switch operating means comprising means operating to open said other switch in response to operation of the second said control means as aforesaid.

2. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; an armature connected to said operating member so as to move therewith; holding means comprising an electromagnet magnetically associated with said armature and operating to hold said operating member in its said first position when said electromagnet is energized and to release said operating member to accommodate movement thereof to its said second position when said electromagnet is de-energized; control means for controlling energization of said electromagnet; means operating to urge movement of said operating member from its said first position to its said second position when released by said holding means; power operating means for moving said operating member from its said second position to its said first position; second control means for said power operating means operating, when said operating member is in its said second position, to cause said power operating means to move said operating member from its said second position to its said first position; grounding means for said ignition system comprising a pair of switches in series with each other; switch operating means for one of said switches comprising means biasing this switch open, and means operating to close this switch in response to movement of said operating member from its said second position to its said first position, said switch operating means for closing said one switch comprising a lost motion coiled spring connection between said operating member and said one switch adapted for spring unloading action in response to predetermined movement of said operating member from its said first position to its said second position thereby allowing said biasing means to open said one switch; and second switch operating means for the other of said switches comprising means operating to close this switch in response to operation of the first said control means in de-energizing said electromagnet, said second switch operating means comprising means operating to open said other switch in response to operation of the second said control means as aforesaid.

3. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; releasable holding means for holding said operating member in its said first position; control means for controlling said holding means to effect release thereof; means operating to urge movement of said operating member from its said first position to its said second position when released by said holding means; power operating means for moving said operating member from its said second position to its said first position; second control means including valving means for said power operating means operating, when said operating member is in its said second position, to cause said power operating means to move said operating member from its said second position to its said first position; grounding means for said ignition system comprising a pair of switches in series with each other; switch operating means for one of said switches comprising means operating to close this switch in response to movement of said operating member from its said second position to its said first position, said switch operating means comprising means operating to open said one switch in response to movement of said operating member from its said first position to its said second position; and second switch operating means for the other of said switches comprising an electromagnet and an armature magnetically associated therewith and operably connected to said second switch so as to close this switch in response to operation of the first said control means in de-energizing said electromagnet, said second switch operating means comprising means providing an operating connection between said valving means and said other switch for opening this switch in response to operation of the second said control means as aforesaid.

4. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; an armature connected to said operating member so as to move therewith; holding means comprising an electromagnet magnetically associated with said armature and operating to hold said operating member in its said first position when said electromagnet is energized and to release said operating member to accommodate movement thereof to its said second position when said electromagnet is de-energized; control means for controlling energization of said electromagnet; means operating to urge movement of said operating member from its said first position to its said second position when released by said holding means; power operating means for moving said operating member from its said second position to its said first position; second control means for said power operating means operating, when said operating member is in its said second position, to cause said power operating means to move said operating member from its said second position to its said first position; grounding means for said ignition system comprising a pair of switches in series with each other; switch operating means for one of said switches comprising means operating to close this switch in response to movement of said operating member from its said second position to its said first position, said switch operating means comprising means operating to open said one switch in response to movement of said operating member from its said first position to its said second position; and second switch operating means for the other of said switches comprising a second armature magnetically associated with said electromagnet and operably connected to said second switch so as to close this switch in response to operation of the first said control means in de-energizing said electromagnet, said second switch operating means comprising means operating to open said other switch in response to operation of the second said control means as aforesaid.

5. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; releasable holding means for holding said operating member in its said first position; control means for controlling said holding means to effect release thereof; means operating to urge movement of said operating member from its said first position to its said second position when released by said holding means; vacuum operating means for moving said operating member from its said second position to its said first position; valving means operable to control vacuum operation of said vacuum operating means; second control means for said valving means operating, when said operating member is in its said second position, to cause vacuum operation of said vacuum operating means thereby to move said operating member from its said second position to its said first position; grounding means for said ignition system comprising a pair of switches in series with each other; switch operating means for one of said switches comprising means operating to close this switch in response to movement of said operating member from its said second position to its said first position, said switch operating means comprising means operating to open said one switch in response to movement of said operating member from its said first position to its said second position; and second switch operating means for the other of said switches comprising an electromagnet and an armature magnetically associated therewith and operably connected to said second switch so as to close this switch in response to operation of the first said control means in de-energizing said electromagnet, said second switch operating means comprising means operating to open said other switch in response to operation of the second said control means as aforesaid.

6. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; an armature connected to said operating member so as to move therewith; holding means comprising an electromagnet magnetically associated with said armature and operating to hold said operating member in its said first position when said electromagnet is energized and to release said operating member to accommodate movement thereof to its said second position when said electromagnet is de-energized; control means for controlling energization of said electromagnet; means operating to urge movement of said operating member from its said first position to its said second position when released by said holding means; vacuum operating means for moving said operating member from its said second position to its said first position; valving means operable to control vacuum operation of said vacuum operating means; second control means for said valving means operating, when said operating member is in its said second position, to cause vacuum operation of said vacuum operating means thereby to move said operating member from its said second position to its said first position; grounding means for said ignition system comprising a pair of switches in series with each other; switch operating means for one of said switches comprising means operating to close this switch in response to movement of said operating member from its said second position to its said first position, said switch operating means comprising means operating to open said one switch in response to movement of said operating member from its said first position to its said second position; and second switch operating means for the other of said switches comprising a second armature magnetically associated with said electromagnet and operably connected to said second switch so as to close this switch in response to operation of the first said control means in de-energizing said electromagnet, said second switch operating means comprising means operating to open said other switch in response to operation of the second said control means as aforesaid.

7. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; means operating to effect movement of said operating member to its said first position; means operating to effect movement of said operating member to its said second position; grounding means for said ignition system comprising a pair of series-arranged switches adapted to ground said ignition system when both of these switches are closed and to restore said ignition system to normal operation when either of said switches is open; means operating as an incident to operation of the first said operating means for causing one of said switches to open and the other of said switches to close and, as an incident to operation of the second said operating means, for causing said one switch to close and said other switch to open; said means for operating said other switch comprising means biasing said other switch to its open position and a spring adapted for thrust-transmission from said operating member, when the latter is moved to its said first position, to effect said closing of said other switch.

8. In a control device for a motor vehicle power transmission having an ignition system adapted to be interrupted to facilitate change in the speed ratio drive through the transmission; an operating member adapted for reciprocatory movement from a first position to a second position for controlling change in the speed ratio drive through the transmission; an armature movable with said operating member; an electromagnet for said armature adapted, when energized, to releasably hold said operating member in its said first position; governor means operable in response to predetermined vehicle drive speed for controlling energization of said electromagnet; pressure differential means controlled by said governor means and including a pressure moved element for effecting movement of said operating member to said first position; means biasing movement of said operating member to its said second position; grounding means for said ignition system comprising a pair of series-arranged switches adapted to ground said ignition system when both of these switches are closed and to restore said ignition system to normal operation when either of said switches is open; switch operating means for one of said switches adapted to maintain this switch open when said electromagnet is energized and said operating member is in its said first position and to effect closing of this switch as an incident to de-energizing said electromagnet; means biasing the other of said switches to open position switch operating means comprising a lost-motion coil spring between said other switch and said pressure moved element adapted, by loading of said spring, to maintain this switch closed when said operating member is in its said first position and during an initial predetermined portion of the movement of said operating member from its said first position toward its said second position while said one switch is closed, and, by unloading of said spring, to effect opening of said other switch by the last said biasing means during the remaining portion of the last said movement of said operating member.

9. In an automotive vehicle provided with an accelerator operated switch, a battery, a vehicle speed responsive governor operated switch, an ignition system and a change speed transmission; power means for in part controlling the ignition system so as to effect disabling operation thereof and for operating the transmission, said power means including a motor, a valve for controlling the operation of said motor, and means for controlling the operation of said valve including electromagnetic means, a switch mounted within the motor and constituting part of electrical means for effecting the aforementioned disabling operation of the ignition system, means for operating said switch comprising a yieldable force transmitting means interconnecting the movable contact of said switch with the power element of the motor and operative to delay the opening of said switch when the power element is moved in one direction, and means for controlling the operation of said electrical means and valve operating electromagnetic means including the aforementioned accelerator operated switch and governor operated switch.

10. In an automotive vehicle provided with an accelerator operated switch, a battery, a vehicle speed responsive governor operated switch, an ignition system and a change speed transmission; power means for in part controlling the ignition system and for operating the transmission, said power means including a motor, a valve for controlling the operation of said motor, and means for controlling the operation of said valve including electromagnetic means, a switch carried by the motor and constituting part of electrical means for disabling the ignition system, means for operating said switch comprising a yieldable force transmitting means interconnecting the movable contact of said switch with the power element of the motor and operative to delay the opening of said switch when the power element is moved in one direction, and means for controlling the operation of said electrical means and valve operating electromagnetic means including the aforementioned accelerator operated switch and governor operated switch.

11. In an automotive vehicle provided with an accelerator operated switch, a vehicle speed responsive governor operated switch, an ignition system and a change speed transmission; power means for in part controlling the ignition system and for operating the transmission, said power means including a motor, a valve for controlling the operation of said motor, a pair of ignition controlling switches at least one of which is carried by the motor, a ground including said pair of switches adapted, when both of these switches are closed, to disable the ignition system, means for operating said one switch comprising a yieldable force transmitting means interconnecting the movable contact of this switch with the power element of the motor and operative to delay the opening of this switch when the power element is moved in one direction, electrical means adapted to function to control operation of said valve and the other of said pair of switches, and means for controlling the functioning of said electrical means including the aforementioned accelerator operated switch and governor operated switch.

12. In a power transmission for driving a vehicle having an engine provided with an ignition system; relatively engageable drive control elements one being movable relative to the other to effect disengagement of said elements when operation of said ignition system is interrupted; a thrust member operable from a first position thereof to a second position thereof in transmitting thrust for moving said movable element as aforesaid; electromagnetic means comprising a flux-generating holding coil adapted, when energized, to releasably hold said thrust member in its said first position; a spring biasing said thrust member toward its said second position; an ignition interrupter switch; an interrupter switch spring biasing said interrupter switch to switch-open condition; a switch operating member adapted to close said interrupter switch; lost-motion means comprising a lost-motion spring operably disposed between said thrust member and said switch operating member, said lost-motion means being so constructed and arranged such that said lost-motion spring operates through said switch operating member to close said interrupter switch when said thrust member moves from its said second position to its said first position and such that said lost-motion spring will maintain said interrupter switch closed during a portion of the movement of said thrust member in its said thrust transmitting direction; and a ground including said interrupter switch for interrupting said ignition system.

13. In a power transmission for driving a vehicle having an engine provided with an ignition system; relatively engageable drive control elements one being movable relative to the other to effect disengagement of said elements when operation of said ignition system is interrupted; a thrust member operable from a first position thereof to a second position thereof in transmitting thrust for moving said movable element as aforesaid; electromagnetic means comprising a flux-generating holding coil adapted, when energized, to releasably hold said thrust member in its said first position; a spring biasing said thrust member toward its said second position; a pair of ignition interrupting control switches; a ground including said switches adapted, when each of said switches is closed, to interrupt said ignition system; a spring biasing one of said switches to switch-open condition; a switch operating member adapted to close said one switch; lost-motion means comprising a lost-motion spring operably disposed between said thrust member and said switch operating member, said lost-motion means being so constructed and arranged such that said lost-motion spring operates through said switch operating member to close said one switch when said thrust member moves from its said second position to its said first position and such that said lost-motion spring will maintain said one switch closed during a portion of the movement of said thrust member in its said thrust transmitting direction; and electrically functioning means for controlling operation of the other of said pair of switches and energization of said holding coil.

14. In a power transmission for driving a vehicle; relatively engageable drive control elements one being movable relative to the other to effect disengagement of said elements when torque between said elements is relieved; a thrust member operable from a first position thereof to a second position thereof in transmitting thrust for moving said movable element as aforesaid; releasable holding means for holding said thrust member in its said first position; a spring biasing said thrust member toward its said second position; torque relieving means operable to facilitate disengagement of said drive control elements; means comprising a switch for controlling operation of said torque relieving means; a switch operating member adapted to close said switch; lost-motion means comprising a lost-motion spring operably disposed between said thrust member and said switch operating member, said lost-motion means being so constructed and arranged such that said lost-motion spring operates through said switch operating member to close said switch when said thrust member moves from its said second position to its said first position and such that said lost-motion spring will maintain said switch closed during a portion of the movement of said thrust member in its said thrust transmitting direction.

15. In a power transmission for driving a vehicle; relatively engageable drive control elements one being movable relative to the other to effect disengagement of said elements when torque between said elements is relieved; a thrust member operable from a first position thereof to a second position thereof in transmitting thrust for moving said movable element as aforesaid; releasable holding means for holding said thrust member in its said first position; a spring biasing said thrust member toward its said second position; a pair of torque-relieving control switches; electrically controlled torque-relieving means including said switches adapted, when each of said switches is closed, to facilitate disengagement of said drive control elements; a switch operating member adapted to close one of said switches; lost-motion means comprising a lost-motion spring operably disposed between said thrust member and said switch operating member, said lost-motion means being so constructed and arranged such that said lost-motion spring operates through said switch operating member to close said one switch when said thrust member moves from its said second position to its said first position and such that said lost-motion spring will maintain said one switch closed during a portion of the movement of said thrust member in its said thrust transmitting direction; and means operable to effect release of said releasable holding means and at the same time cause the other of said switches to close.

16. In a servo-motor of the character described; a reciprocatory element adapted for movement from a first position to a second position thereof; means for effecting reciprocatory movement of said element between said positions; an electrical switch comprising relatively engageable contacts one being biased away from engagement with the other to open said switch; a spring operating to yieldingly urge said one contact to open switch position; and thrust-transmitting means operable between said element and said one contact for controlling opening and closing of said switch as a function of movement of said element; said thrust-transmitting means comprising a first member engageable by said element, a second member engageable with said one contact, and a second spring providing a yielding thrust-transmitting connection between said first and second members such that movement of said element to its said first position transmits thrust through said first member, said second spring, and said second member to effect engagement of said one contact with said other contact to close said switch and such that movement of said element to its said second position effects unloading of said second spring sufficiently to accommodate biasing of said one contact by said first spring to open said switch.

17. In a servo-motor of the character described; a pressure fluid operated member adapted to be moved by differential pressure fluid in one direction to a first position thereof and by spring force in the opposite direction to a second position thereof; chamber-forming means for said member adapted to be subjected to pressure fluid or vented to control said movements of said member; control means operable to cause said chamber-forming means to be subjected to pressure fluid or to be vented; a first switch; means effecting opening and closing of said first switch as an incident to operation of said control means; a second switch; and means effecting opening of said second switch as an incident to predetermined movement of said member in its direction of movement by spring force and closing of said second switch as an incident to predetermined movement of said member in its said direction of movement by differential pressure fluid.

18. In an automotive vehicle provided with an ignition system and a change-speed transmission, power means for operating the transmission and for momentarily disabling the ignition system during one of the operations of the power means, said means including a motor unit comprising a casing and a power element, the latter being operably connected to the transmission, switch means, including a movable contact member and a fixed contact member, mounted on said casing, said switch constituting an element of that part of the power means operative to momentarily disable the ignition system and a power element operated force transmitting means for operating the movable contact of said switch, said force transmitting means including two separate springs, one weaker than the other, the parts of said force transmitting means being so constructed and arranged and so operative that when the power element moves in one direction the switch is closed both springs being compressed and when the power element moves in the opposite direction one of said springs expands before the switch is opened thereby delaying the opening of the switch until the power element has moved to a certain position.

19. In an automotive vehicle provided with an engine controlling ignition system and a change-speed transmission, power means for operating the transmission and in part controlling the ignition system, said power means including a motor unit comprising a casing having housed therein a transmission operating power element, a power element operated ignition controlling interrupter switch, a valve for controlling the operation of said motor unit mounted in one end of said casing said valve comprising a plate lying in a plane parallel to or substantially parallel to the plane of the power element and reciprocable within said casing in its opening and closing operations, and an electromagnet positioned between said power element and valve, said electromagnet serving, when energized, as a means for holding the power element in a position to maintain a certain setting of the transmission and maintain said interrupter switch closed said electromagnet also serving, together with a spring to operate said valve.

20. In an automotive vehicle provided with an accelerator, a vehicle speed responsive governor, a change speed transmission and an ignition system, power means for operating said transmission and in part controlling the operation of the ignition system, said power means including a pressure differential and spring operated motor, and further including means for controlling the operation of the ignition system and motor, said control means including a valve for controlling the operation of said motor, an ignition controlling breaker switch for controlling the operation of the ignition system, and means including electromagnetic means, for operating said valve and in part controlling the operation of said switch, means for controlling the operation of said electromagnetic means including an accelerator operated switch and a governor operated switch, and force transmitting means operated by the electromagnetic means and comprising two springs connected in series, one of said springs being stronger than the other, whereby by virtue of said series connection, the weaker of the two springs is compressed before the remaining spring is compressed when one operation of the power means is being effected and the stronger of said two springs expands before the remaining spring expands when another operation of the power means is being effected.

21. In an automotive vehicle provided with a change-speed transmission and an engine controlling ignition system, power means for operating said transmission and in part controlling the operation of said ignition system, said power means including a spring and pressure differential operated motor unit comprising a casing, a power element housed within said casing, transmission operating force transmitting means connected with the power element, a power element operating spring interposed between said element and one part of the casing, a power element holding coil housed within said casing, an ignition controlling switch positioned adjacent said holding coil, said switch including fixed contact means secured to the casing and further including a spring-biased contact member supported for swinging movement into and out of engagement with respect to said fixed contact means, and switch operating force transmitting means, including a yieldable member, interposed between a portion of the aforementioned force transmitting means and the movable contact member, the parts of said mechanism being so constructed and arranged that when the holding coil is energized and the motor unit is energized by subjecting its power element to a differential of pressures then the switch is closed by the movement of the power element to a certain position, said power element being held by the holding coil in this position, the parts of the mechanism also being so constructed and arranged that when the holding coil is deenergized and the motor unit is energized by the expansion of the aforementioned spring, then the switch is opened, by the action of said spring bias, after the power element has moved a sufficient distance to permit the yieldable member to expand.

22. In an automotive vehicle provided with an ignition system and a change speed transmission, power means for operating the transmission and for momentarily disabling the ignition system during one of the operations of the power means, said means including a motor comprising a casing and a power element, the latter being operably connected to the transmission, a switch mounted on said casing and having a movable contact, a spring biasing said movable contact to open said switch, said switch constituting an element of that part of the power means operative to momentarily disable the ignition system, and force transmitting means interposed between said movable contact of said switch and the power element of the motor, said force transmitting means including a second spring stronger than the first said spring to enable it when loaded to overcome the bias of the first said spring and thereby close said switch, the parts of said force transmitting means being so constructed and arranged and so operative that when the power element moves in one direction said switch is closed both springs being loaded and when the power element moves in the opposite direction said stronger spring has an unloading action before said switch is opened thereby delaying the opening of said switch until the power element has moved to a certain position.

23. In a servo-motor for controlling interruption of engine ignition; chamber-forming means; a pressure fluid operated member operable associated with said chamber for movement in one direction to a first position thereof by vacuum and in the opposite direction to a second position thereof by spring pressure; a spring biasing said member to its said second position; an electrical switch for controlling said ignition interruption, said switch comprising relatively engageable contacts; a spring biasing one of said contacts in a direction away from engagement with the other to open said switch; and lost-motion operating means including a thrust-transmitting spring operably disposed between said member and said one contact for controlling opening and closing of said switch as a function of movement of said member such that vacuum movement of said member to its said first position loads said thrust-transmitting spring and transmits such spring load to said one contact to effect engagement of said one contact with said other contact to close said switch and such that spring pressure movement of said member to its said second position effects unloading of said thrust-transmitting spring sufficiently to accommodate biasing of said one contact to open said switch after said member has moved to a predetermined position in a direction toward its said second position.

24. In a servo-motor of the character described; a reciprocatory element adapted for movement from a first position to a second position thereof; an electrical switch comprising relatively engageable contacts one being biased away from engagement with the other to open said switch; a spring biasing said one contact to open switch position; and lost-motion operating means including a thrust-transmitting spring operably disposed between said element and said one contact for controlling opening and closing of said switch as a function of movement of said element such that movement of said element to its said first position transmits thrust through said thrust-transmitting spring to overcome the force of the first said spring and effect engagement of said one contact with said other contact to close said switch and such that movement of said element to its said second position effects unloading of said thrust-transmitting spring sufficiently to accommodate biasing of said one contact by the first said spring to open said switch.

TENO IAVELLI.
VICTOR E. MATULAITIS.

REFERENCES CITED

The following references are of record in the file of this patent:

UNITED STATES PATENTS

| Number | Name | Date |
|---|---|---|
| 1,507,193 | May | Sept. 2, 1924 |
| 2,214,100 | Claytor | Sept. 10, 1940 |
| 2,257,838 | Claytor | Oct. 7, 1941 |

Certificate of Correction

Patent No. 2,455,933.  December 14, 1948.

TENO IAVELLI ET AL.

It is hereby certified that errors appear in the printed specification of the above numbered patent requiring correction as follows:

Column 15, line 69, claim 7, after the word "switch" and before the period insert *in opposition to said biasing means*; column 21, line 58, claim 23, for "operable" read *operably*;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*